(12) United States Patent
Ohtomo et al.

(10) Patent No.: US 11,402,206 B2
(45) Date of Patent: Aug. 2, 2022

(54) SURVEYING INSTRUMENT AND SURVEYING INSTRUMENT SYSTEM

(71) Applicant: TOPCON Corporation, Tokyo-to (JP)

(72) Inventors: Fumio Ohtomo, Saitama (JP); Ikuo Ishinabe, Tokyo-to (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 448 days.

(21) Appl. No.: 16/571,572

(22) Filed: Sep. 16, 2019

(65) Prior Publication Data

US 2020/0096334 A1    Mar. 26, 2020

(30) Foreign Application Priority Data

Sep. 25, 2018   (JP) .............................. JP2018-179555

(51) Int. Cl.
| | |
|---|---|
| *G01C 15/00* | (2006.01) |
| *G01C 11/14* | (2006.01) |
| *G01S 17/66* | (2006.01) |
| *G01S 7/48* | (2006.01) |
| *G01S 7/481* | (2006.01) |

(52) U.S. Cl.
CPC ............ *G01C 15/002* (2013.01); *G01C 11/14* (2013.01); *G01S 7/4808* (2013.01); *G01S 17/66* (2013.01); *G01S 7/4817* (2013.01)

(58) Field of Classification Search
CPC ...... G01C 11/06; G01C 11/14; G01C 15/002; G01C 1/04; G01C 11/00; G01C 15/004;
(Continued)

(56) References Cited

U.S. PATENT DOCUMENTS

2002/0085193 A1   7/2002 Ohtomo et al.
2004/0246498 A1* 12/2004 Kumagai ............. G01C 15/002
                                                   356/614
(Continued)

FOREIGN PATENT DOCUMENTS

JP    2006-503275 A    1/2006
JP    4356050 B2      11/2009
(Continued)

*Primary Examiner* — Yuqing Xiao
*Assistant Examiner* — Amir J Askarian
(74) *Attorney, Agent, or Firm* — Nields, Lemack & Frame, LLC

(57) ABSTRACT

A surveying instrument comprises a distance measuring light projecting module, a light receiving module, an optical axis deflector which integrally deflects a distance measuring optical axis and a light receiving optical axis, a wide-angle image pickup module, a projecting direction detecting module configured to detect an optical axis deflection angle and a deflecting direction, a narrow-angle image pickup module, a distance measurement calculating module and an arithmetic control module, wherein the arithmetic control module is configured to control the optical axis deflector and the distance measurement calculating module, wherein the distance measurement calculating module is configured to perform a distance measurement of a measuring point based on a light emission timing of a distance measuring light and a light reception timing of a reflected distance measuring light, and wherein the narrow-angle image pickup module is configured to acquire a narrow-angle image with the distance measuring optical axis as an image center.

12 Claims, 5 Drawing Sheets

(58) Field of Classification Search
CPC ........... G01C 15/02; G01C 3/08; G01S 17/66; G01S 17/86; G01S 7/4808; G01S 7/4817; G01S 17/89; G01S 17/08; G01S 17/42; G01S 7/4818; G01S 7/497; G01S 7/4811; G01S 7/4812; G01S 7/484; G01S 7/4972
See application file for complete search history.

(56) References Cited

U.S. PATENT DOCUMENTS

| | | | |
|---|---|---|---|
| 2006/0158423 A1 | 7/2006 | Kern et al. | |
| 2015/0116693 A1* | 4/2015 | Ohtomo | G01C 15/002 356/4.01 |
| 2015/0177382 A1* | 6/2015 | Vogel | G01S 17/08 250/203.2 |
| 2016/0238385 A1* | 8/2016 | Ohtomo | G01C 15/002 |
| 2016/0238708 A1 | 8/2016 | Ohtomo et al. | |
| 2016/0245644 A1* | 8/2016 | Yamamoto | G01B 11/2518 |
| 2016/0259039 A1 | 9/2016 | Ohtomo et al. | |
| 2017/0168142 A1 | 6/2017 | Kumagai et al. | |
| 2017/0227357 A1 | 8/2017 | Ohtomo et al. | |
| 2018/0284282 A1* | 10/2018 | Hong | G02B 26/0891 |

FOREIGN PATENT DOCUMENTS

| | | |
|---|---|---|
| JP | 2016-151422 A | 8/2016 |
| JP | 2016-151423 A | 8/2016 |
| JP | 2016-161411 A | 9/2016 |
| JP | 2017-106813 A | 6/2017 |
| JP | 2017-142081 A | 8/2017 |

\* cited by examiner

SURVEYING INSTRUMENT AND SURVEYING INSTRUMENT SYSTEM

BACKGROUND OF THE INVENTION

The present invention relates to a surveying instrument and a surveying instrument system which enable to acquire a wide-angle image and narrow-angle image.

As a surveying instrument, there is a total station. The total station sights an object to be measured by a telescope with high magnification which also serves as a distance measuring optical system, performs measurements, further horizontally rotates/vertically rotates the telescope, sequentially sights different objects to be measured and the like, and performs the measurements. Alternatively, the total station follows up a movement of the object to be measured, horizontally rotates/vertically rotates the telescope, sights the object to be measured, and carries out the measurements while tracking the object to be measured.

However, a magnification of the telescope is high, a field angle is as very narrow as approximately 2°, and further an inertia of the telescope itself is large. Further, since high rigidity is required for a supporting mechanism of the telescope, a supporting mechanical unit itself also has a large inertia.

For this reason, at a time of changing the object to be measured, it is difficult to horizontally rotates/vertically rotates the telescope at a high speed and quickly sight the object to be measured. Further, in a case where the object to be measured is tracked, when the movement of the object to be measured is rapid, the telescope cannot follow up the movement and the object to be measured may go out of a visual field of the telescope. When the object to be measured once goes out of the visual field, since the field angle of the telescope is narrow, it takes much time to capture the object to be measured again, which causes a deterioration in a workability of the measurement.

SUMMARY OF THE INVENTION

It is an object of the present invention to provide a surveying instrument and a surveying instrument system which enable to sight an object to be measured at a high speed and to acquire an image of a sighted position.

To attain the object as described above, a surveying instrument according to the present invention comprises a distance measuring light projecting module configured to project a distance measuring light, a light receiving module configured to receive a reflected distance measuring light, an optical axis deflector which is provided at a common part of a distance measuring optical axis and a light receiving optical axis and integrally deflects the distance measuring optical axis and the light receiving optical axis, a wide-angle image pickup module having approximately the same field angle as a maximum deflection range of the optical axis deflector, a projecting direction detecting module configured to detect an optical axis deflection angle and a deflecting direction by the optical axis deflector, a narrow-angle image pickup module having an optical axis a part of which is common to the distance measuring optical axis and having a field angle narrower than the field angle of the wide-angle image pickup module, a distance measurement calculating module and an arithmetic control module, wherein the arithmetic control module is configured to control an optical axis deflection of the optical axis deflector and a distance measuring operation of the distance measurement calculating module, wherein the distance measurement calculating module is configured to perform a distance measurement of a measuring point based on a light emission timing of the distance measuring light and a light reception timing of the reflected distance measuring light, and wherein the narrow-angle image pickup module is configured to acquire a narrow-angle image with the distance measuring optical axis as an image center.

Further, in the surveying instrument according to a preferred embodiment, the narrow-angle image pickup module has a tracking light receiving optical axis branched from a projection optical axis of the distance measuring light projecting module and a tracking image pickup element provided on the tracking light receiving optical axis, and the narrow-angle image pickup module is configured to acquire the narrow-angle image by the tracking image pickup element via the projection optical axis.

Further, the surveying instrument according to a preferred embodiment further comprises a tracking module, wherein the tracking module has a tracking optical axis a part of which is common to the light receiving optical axis, a tracking light receiving optical axis branched from a projection optical axis of the distance measuring light projecting module, a tracking light source provided on the tracking optical axis, and a tracking image pickup element provided on the tracking light receiving optical axis, wherein the tracking module is configured in such a manner that a tracking light, as emitted from the tracking light source, is projected via the light receiving optical axis, the tracking light reflected by an object to be measured is received by the tracking image pickup element via the projection optical axis and the tracking light receiving optical axis, and wherein the arithmetic control module is configured to control a deflection of the optical axis deflector based on a deviation on the tracking image pickup element between a light receiving position of the tracking light and the tracking light receiving optical axis.

Further, in the surveying instrument according to a preferred embodiment, the tracking light receiving optical axis is branched by a polarizing beam splitter, the distance measuring light and the tracking light have different polarizations, and the distance measuring light is separated from the tracking light by the polarizing beam splitter.

Further, in the surveying instrument according to a preferred embodiment, the optical axis deflector comprises two disk prisms which are coaxially provided, each of the disk prisms is constituted of a plurality of triangular prisms with the same optical characteristics and is independently rotatable around the distance measuring optical axis and the light receiving optical axis, and wherein the arithmetic control module is configured to control rotations of the two disk prisms, to make the distance measuring light scan in a two-dimensional closed loop and to acquire point cloud data.

Further, in the surveying instrument according to a preferred embodiment, the arithmetic control module is configured to synchronize a distance measurement timing with an image acquisition by the narrow-angle image pickup module and to acquire a still image at an arbitrary position while scanning.

Further, in the surveying instrument according to a preferred embodiment, the arithmetic control module is configured to associate a narrow-angle image with a wide-angle image based on a deflection angle and a deflecting direction detected by the projecting direction detecting module at the time of when acquiring the narrow-angle image by the narrow-angle image pickup module and a position of each pixel of the wide-angle image corresponding to the deflection angle and the deflecting direction.

Furthermore, a surveying instrument system according to the present invention comprises an above-mentioned surveying instrument, wherein a supporting unit for installing the surveying instrument and an installation base unit which is a supporting part of the surveying instrument, wherein the installation base unit includes a rotary driving module configured to rotate and drive the surveying instrument in a horizontal direction and a vertical direction and angle detectors adapted to detect a horizontal rotation angle and a vertical rotation angle, and wherein the arithmetic control module is configured to control the rotary driving module of the optical axis deflector and to carry out a tracking of an object to be measured, and the arithmetic control module is configured to control the rotary driving module of the installation base unit and the rotary driving module of the optical axis deflector in such a manner that a deflection angle of the distance measuring optical axis detected by the projecting direction detecting module becomes 0.

According to the present invention, the surveying instrument comprises a distance measuring light projecting module configured to project a distance measuring light, a light receiving module configured to receive a reflected distance measuring light, an optical axis deflector which is provided at a common part of a distance measuring optical axis and a light receiving optical axis and integrally deflects the distance measuring optical axis and the light receiving optical axis, a wide-angle image pickup module having approximately the same field angle as a maximum deflection range of the optical axis deflector, a projecting direction detecting module configured to detect an optical axis deflection angle and a deflecting direction by the optical axis deflector, a narrow-angle image pickup module having an optical axis a part of which is common to the distance measuring optical axis and having a field angle narrower than the field angle of the wide-angle image pickup module, a distance measurement calculating module and an arithmetic control module, wherein the arithmetic control module is configured to control an optical axis deflection of the optical axis deflector and a distance measuring operation of the distance measurement calculating module, wherein the distance measurement calculating module is configured to perform a distance measurement of a measuring point based on a light emission timing of the distance measuring light and a light reception timing of the reflected distance measuring light, and wherein the narrow-angle image pickup module is configured to acquire a narrow-angle image with the distance measuring optical axis as an image center. As a result, an image of the measuring point can be always acquired, a position of the measuring point can be easily confirmed, further the narrow-angle image is an image close to the optical axis, a depth of a focus is large, and a focus adjustment can be simplified.

Further, according to the present invention, the surveying instrument system comprises the above-mentioned surveying instrument, wherein a supporting unit for installing the surveying instrument and an installation base unit which is a supporting part of the surveying instrument, wherein the installation base unit includes a rotary driving module configured to rotate and drive the surveying instrument in a horizontal direction and a vertical direction and angle detectors adapted to detect a horizontal rotation angle and a vertical rotation angle, and wherein the arithmetic control module is configured to control the rotary driving module of the optical axis deflector and to carry out a tracking of an object to be measured, and the arithmetic control module is configured to control the rotary driving module of the installation base unit and the rotary driving module of the optical axis deflector in such a manner that a deflection angle of the distance measuring optical axis detected by the projecting direction detecting module becomes 0. As a result, the image of the measuring point can be always acquired, the position of the measuring point can be easily confirmed, further the narrow-angle image is the image close to the optical axis, the depth of the focus is large, the focus adjustment can be simplified, a tracking in a wide range can be performed at a high speed and with high responsiveness.

DETAILED DESCRIPTION OF THE PREFERRED EMBODIMENT

A description will be given below on an embodiment of the present invention by referring to the attached drawings.

A surveying instrument system according to the embodiment of the present invention will be described by FIG. 1, FIG. 2 and FIG. 3.

Figure 1:
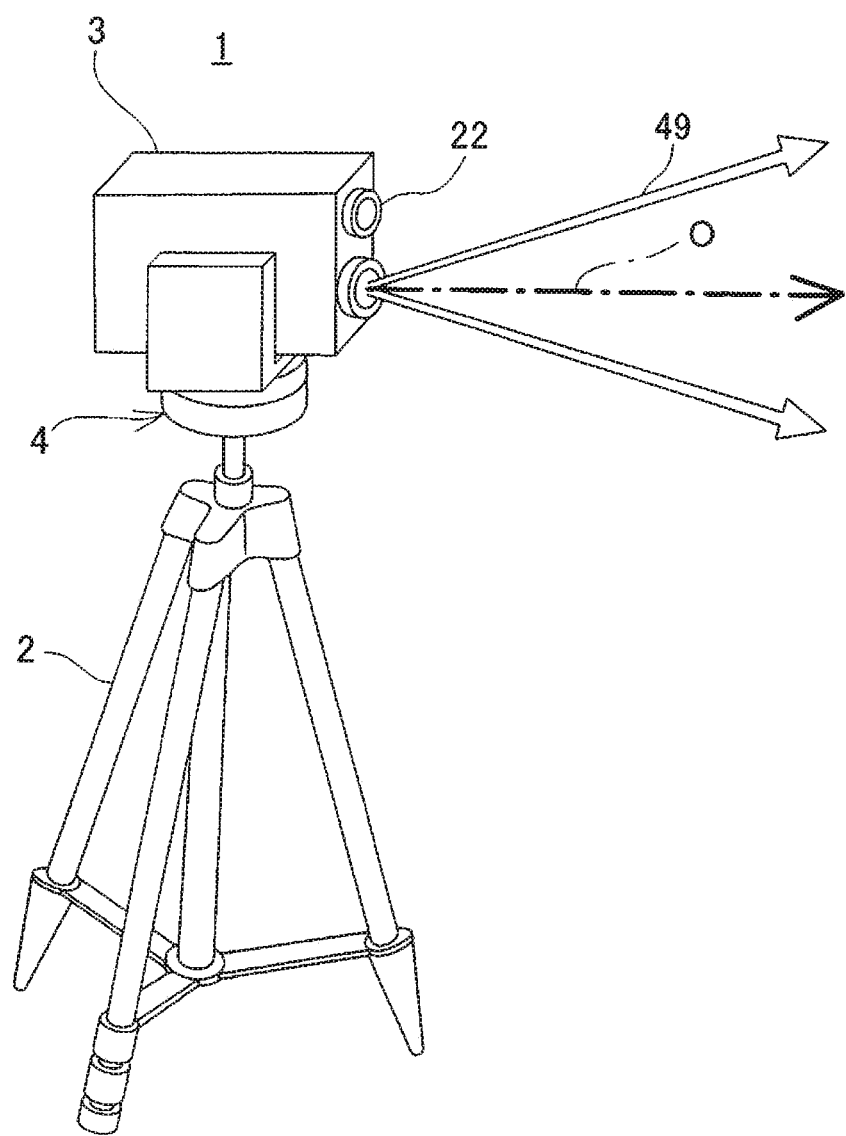
FIG. 1 is an external view of a surveying instrument system according to an embodiment of the present invention.

In FIG. 1, a reference numeral 1 denotes a surveying instrument system, a reference character "O" denotes a distance measuring optical axis in a state where an optical axis is not deflected, and the distance measuring optical axis at this time is determined as a reference optical axis.

The surveying instrument system 1 mainly has a tripod 2 as a supporting unit, a surveying instrument 3, an installation base unit 4 which is a supporting part of the surveying instrument 3.

The installation base unit 4 is mounted on an upper end of the tripod 2, and the surveying instrument 3 is supported by the installation base unit 4 rotatably in an up-and-down direction and in a left-and-right direction, respectively.

Figure 2:
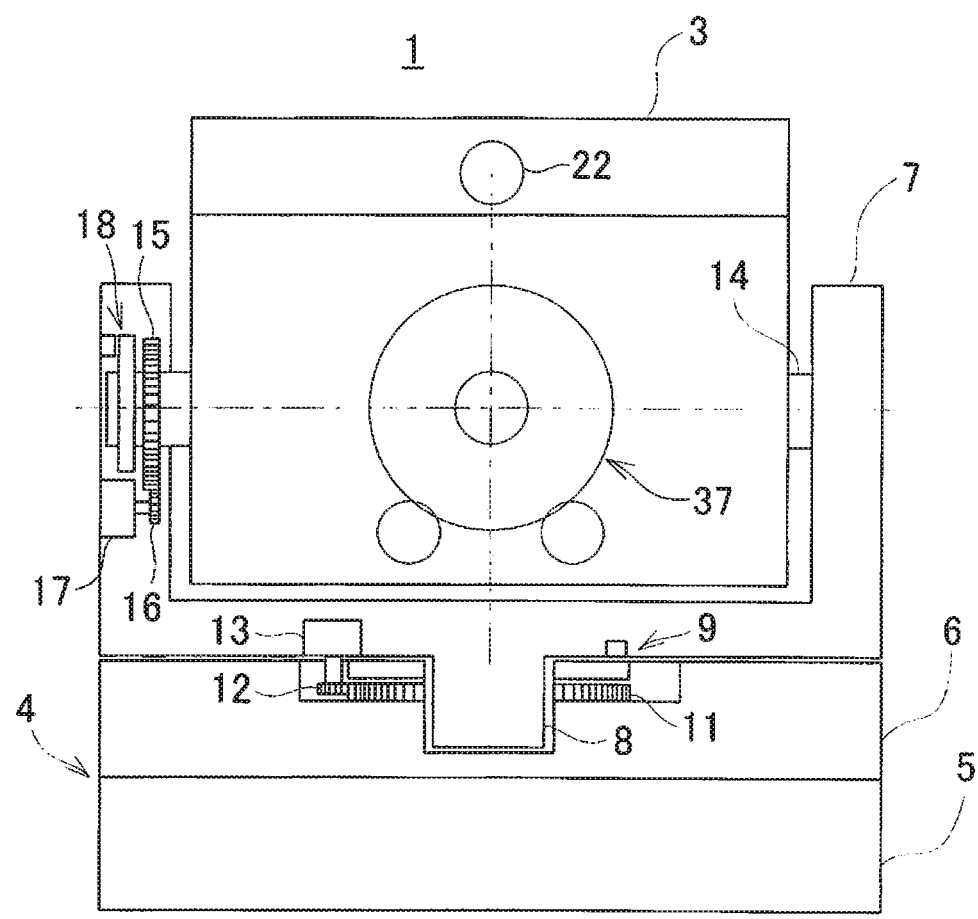
FIG. 2 is a front view of a surveying instrument in the surveying instrument system.
Figure 3:
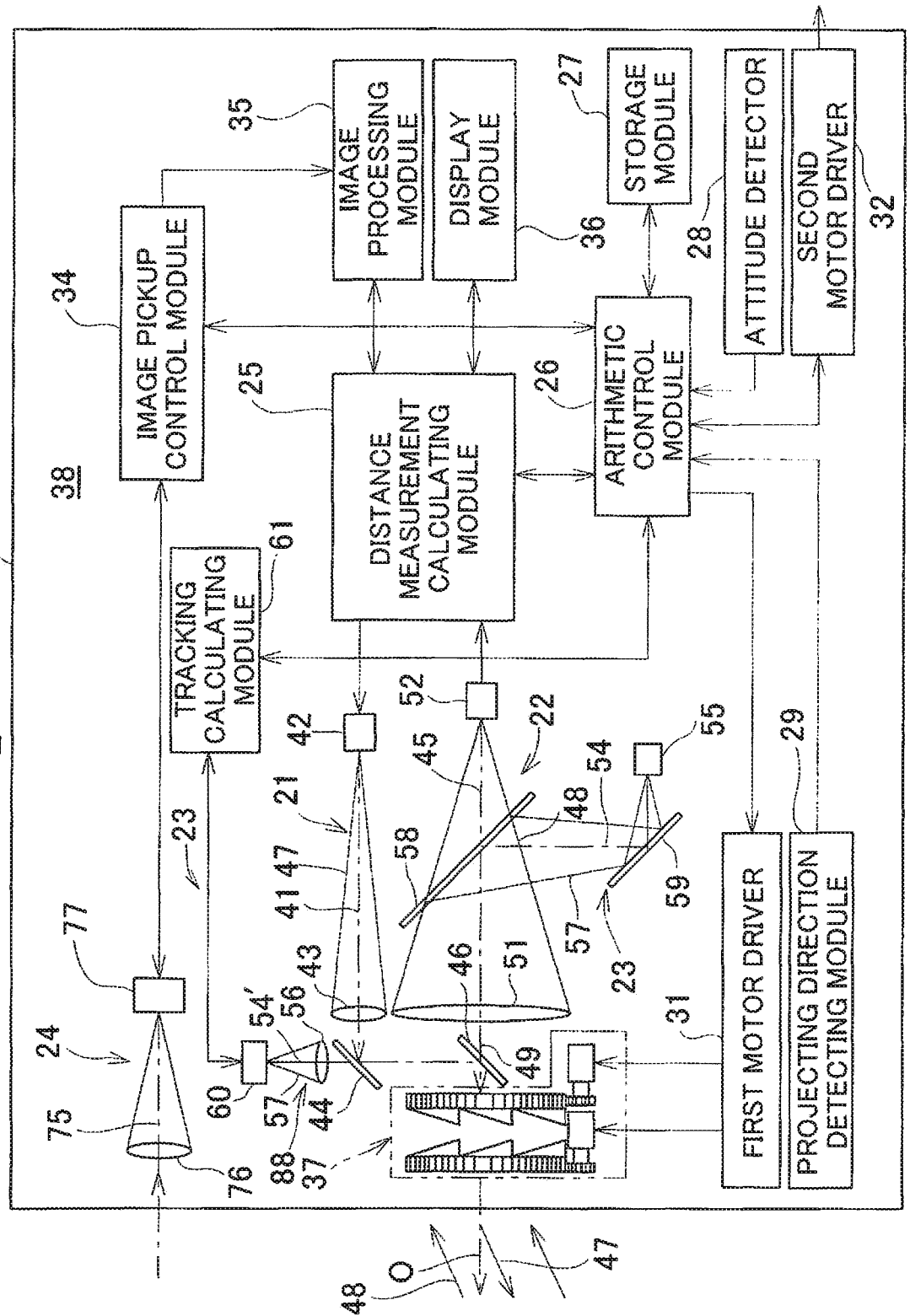
FIG. 3 is a schematical block diagram of the surveying instrument.

As shown in FIG. 2, the installation base unit 4 has a base member 5 which is fixed on the upper end of the tripod 2, a horizontal base plate 6 which is fixedly mounted on the base member 5 and a frame unit 7 which is provided on the horizontal base plate 6 rotatably in a horizontal direction. On the frame unit 7, the surveying instrument 3 is mounted rotatably in a vertical direction.

A horizontal rotation shaft 8 is protruded from a lower surface of the frame unit 7, and the horizontal rotation shaft 8 is rotatably fitted to the horizontal base plate 6 via a bearing (not shown). The frame unit 7 is capable of rotating freely around the horizontal rotation shaft 8 in the horizontal direction.

Further, a horizontal angle detector 9 (encoder, for instance) which detects a horizontal angle (angle in a rotating direction around the horizontal rotation shaft 8) is provided between the horizontal rotation shaft 8 and the horizontal base plate 6. A relative rotation angle of the frame unit 7 in the horizontal direction with respect to the horizontal base plate 6 is detected by the horizontal angle detector 9.

A horizontal rotation gear 11 is fixed to the horizontal base plate 6 concentrically with the horizontal rotation shaft 8, and a horizontal pinion gear 12 is meshed with the horizontal rotation gear 11. A horizontal motor 13 as a horizontal rotary driving module is provided on the frame unit 7, and the horizontal pinion gear 12 is fixed to an output shaft of the horizontal motor 13.

The horizontal pinion gear 12 is rotated by driving of the horizontal motor 13, and the horizontal pinion gear 12 revolves around the horizontal rotation gear 11. By revolving the horizontal pinion gear 12, the frame unit 7 and the surveying instrument 3 are integrally rotated around the horizontal rotation shaft 8. Thus, the surveying instrument 3 is rotated by the horizontal motor 13 in the horizontal direction.

The frame unit 7 has a recess shape with a recess portion, and the surveying instrument 3 is accommodated in the recess portion. The surveying instrument 3 is supported by the frame unit 7 via a vertical rotation shaft 14, and the surveying instrument 3 is capable of rotating freely around the vertical rotation shaft 14 in the vertical direction.

A vertical rotation gear 15 is fitted and fixed to one end of the vertical rotation shaft 14, and a pinion gear 16 is meshed with the vertical rotation gear 15. The pinion gear 16 is fixed to an output shaft of a vertical motor 17, which is provided on the frame unit 7 as a vertical rotary driving module. When the vertical motor 17 is driven, the pinion gear 16 is rotated, and further the surveying instrument 3 is rotated in the vertical direction via the vertical rotation gear 15 and the vertical rotation shaft 14.

Further, a vertical angle detector 18 (encoder, for instance) which detects a vertical angle (angle in the rotating direction around the vertical rotation shaft 14) is provided between the vertical rotation shaft 14 and the frame unit 7. A relative rotation angle of the surveying instrument 3 in the vertical direction with respect to the frame unit 7 is detected by the vertical angle detector 18.

The horizontal motor 13 and the vertical motor 17 are driven by a second motor driver 32 (to be described later), and the horizontal motor 13 and the vertical motor 17 are driven/controlled by an arithmetic control module 26 (to be described later) as a control unit via the second motor driver 32 in such a manner that a required rotation amount is obtained at a required timing.

A rotation amount of the horizontal motor 13 (that is, a horizontal angle of the frame unit 7) is detected by the horizontal angle detector 9. A rotation amount of the vertical motor 17 (that is, a vertical angle of the surveying instrument 3) is detected by the vertical angle detector 18.

Thus, the horizontal angle and the vertical angle of the surveying instrument 3 are detected by the horizontal angle detector 9 and the vertical angle detector 18, respectively, and detection results are input into the arithmetic control module 26, respectively. The horizontal motor 13 and the vertical motor 17 make up a rotary driving module.

The horizontal angle detector 9 and the vertical angle detector 18 make up an angle detector which detects a vertical rotation angle and a horizontal rotation angle of the surveying instrument 3, that is, a directional angle detector.

A further description will be given on the surveying instrument 3 by FIG. 3 and FIG. 4.

The surveying instrument 3 mainly includes a distance measuring light projecting module 21, a light receiving module 22, a tracking module 23, a wide-angle image pickup module 24, a distance measurement calculating module 25, the arithmetic control module 26, a storage module 27, an attitude detector 28, a projecting direction detecting module 29, a first motor driver 31, the second motor driver 32, an image pickup control module 34, an image processing module 35, a display module 36, an optical axis deflector 37 and a tracking calculating module 61, and they are accommodated in a casing 40 and integrated. It is to be noted that the distance measuring light projecting module 21, the light receiving module 22, the distance measurement calculating module 25, the optical axis deflector 37 and the like make up a distance measuring unit 38 which functions as an electronic distance meter.

As each of the distance measurement calculating module 25 and the arithmetic control module 26, a CPU specialized for this embodiment, a general-purpose CPU, a built-in CPU, a microprocessor or the like is used. Further, as the storage module 27, a semiconductor memory such as a RAM, a ROM, a FlashROM or a DRAM, a magnetic recording memory such as an HDD, or an optical recording memory such as a CDROM is used.

In the storage module 27 are stored various programs configured to carry out this embodiment, and the distance measurement calculating module 25 and the arithmetic control module 26 develop and execute the stored programs, respectively. Further, in the storage module 27, various data such as measurement data and image data are stored.

The arithmetic control module 26 controls the optical axis deflector 37 via the first motor driver 31. Further, the arithmetic control module 26 controls a deflection of the distance measuring optical axis via the optical axis deflector 37, and performs an integral control over the distance measurement calculating module 25, the image pickup control module 34, and the tracking calculating module 61, and a synchronous control of a distance measurement, an image pickup, a tracking, and the like.

The attitude detector 28 detects a tilt of the surveying instrument 3 with respect to the horizontal or with respect to the vertical, and a detection result is inputted into the arithmetic control module 26. Further, as the attitude detector 28, a tilt detector such as a tilt sensor is used, and an attitude detection device disclosed in Japanese Patent Application Publication No. 2017-106813 can be used. An attitude detection device in Japanese Patent Application Publication No. 2016-151423 can detect a tilt over 360° in all directions in real time.

The distance measuring light projecting module 21 has a projection optical axis 41, and a light emitter 42 as a distance measuring light source, for instance, a laser diode (LD) is provided on the projection optical axis 41. Further, a projecting lens 43 is provided on the projection optical axis 41. Further, a beam splitter 44 as a deflection optical component provided on the projection optical axis 41 and a reflection mirror 46 as a deflection optical component provided on a light receiving optical axis 45 (to be described later) deflect the projection optical axis 41 in such a manner that the projection optical axis 41 coincides with the light receiving optical axis 45. The reflection mirror 46 has a shape which is equal to or slightly larger than a luminous flux diameter of the distance measuring light 47, and the reflection mirror 46 occupies a limited portion with the light receiving optical axis 45 as a center.

The beam splitter 44 may be a half mirror, but the beam splitter 44 is preferably a polarizing beam splitter with polarization optical characteristics. For instance, the polarizing beam splitter 44 has optical characteristics to reflect an S-polarized light and transmit a P-polarized light.

The beam splitter 44 and the reflection mirror 46 make up a projection optical axis deflector.

The light emitter 42 pulse-emits a laser beam or burst-emits a laser beam. The distance measuring light projecting module 21 projects a pulsed laser beam (or a burst-emitted laser beam) emitted from the light emitter 42 as the distance measuring light 47. It is to be noted that a burst emission is disclosed in Japanese Patent Application Publication No. 2016-161411.

A description will be given on the light receiving module 22. To the light receiving module 22, a reflected distance measuring light 48 is incident from the object to be measured. The light receiving module 22 has the light receiving optical axis 45. The projection optical axis 41 as deflected by the beam splitter 44 and the reflection mirror 46 coincides with the light receiving optical axis 45.

It is to be noted that a state where the projection optical axis 41 coincides with the light receiving optical axis 45 is referred to as a distance measuring optical axis 49 (see FIG. 1).

The optical axis deflector 37 is disposed on the distance measuring optical axis 49. A straight optical axis transmitted through a center of the optical axis deflector 37 is the reference optical axis "O". The reference optical axis "O" coincides with the projection optical axis 41, the light receiving optical axis 45, a tracking optical axis 54 (to be described later) and the distance measuring optical axis 49 when these axes are not deflected by the optical axis deflector 37.

A focusing lens 51 is disposed on the light receiving optical axis 45, which transmits through the optical axis deflector 37. Further, a photodetector 52 is provided on the light receiving optical axis 45. The photodetector 52 is a photodiode (PD), an avalanche photodiode (APD) or an equivalent photoelectric conversion element.

The focusing lens 51 focuses the reflected distance measuring light 48 on the photodetector 52. The photodetector 52 receives the reflected distance measuring light 48 and produces a light receiving signal. The light receiving signal is inputted into the distance measurement calculating module 25. The distance measurement calculating module 25 performs the distance measurement (electronic distance measurement) to the object to be measured based on a light emission timing of the distance measuring light, a light reception timing of the reflected distance measuring light and the light velocity.

It is to be noted that, as the measurement, a prism measurement in which the object to be measured has a retro-reflectivity or a non-prism measurement in which the object to be measured has no retro-reflectivity is carried out.

The optical axis deflector 37, the focusing lens 51, the photodetector 52, and the like make up the light receiving module 22.

A description will be given on the tracking module 23. The tracking module 23 has the tracking optical axis 54, and a tracking light source 55, a reflection mirror 59, a split mirror 58, the focusing lens 51, the reflection mirror 46 and the optical axis deflector 37 are arranged on the tracking optical axis 54. The tracking optical axis 54 is deflected by the reflection mirror 59 and the split mirror 58, and the tracking optical axis 54 coincides with the light receiving optical axis 45 and the distance measuring optical axis 49. Here, the focusing lens 51 functions as a projecting lens in the tracking module 23.

It is to be noted that, as the tracking light source 55 which emits the tracking light 57, a light emitting source such as a laser diode (LD) is used, and the tracking light 57 and the distance measuring light 47 preferably have the same wave length. Further, as the tracking light source 55, a light beam emitted from the laser diode may be led through an optical fiber, and a projection end surface of the optical fiber may be formed as a tracking light source. Further, as the tracking light 57, an unpolarized beam (beam with no polarization characteristics) is adopted.

The split mirror 58 may be a half mirror, but the split mirror 58 also may be a non-polarizing beam splitter in which a transmitted light amount and a reflected light amount are different. A light amount ratio of the transmitted light amount and the reflected light amount can be appropriately set in accordance with a performance required for the surveying instrument, and the transmitted light amount: the reflected light amount=7:3 is set, for instance. It is to be noted that, in order to prevent a decrease in a distance measuring light amount, the beam splitter 44 is preferably a polarizing beam splitter which reflects the S-polarized light.

Further, in a case where the beam splitter 44 is the polarizing beam splitter, a polarization characteristic of the distance measuring light 47 is set to be different from a polarization characteristic of the tracking light 57. For instance, the distance measuring light 47 emitted from the light emitter 42 is determined as the S-polarized light, and the tracking light 57 emitted from the tracking light source 55 is determined as an unpolarized light.

In this case, the tracking light 57 as emitted from the tracking light source 55 is partially (for instance, 3/10) reflected by the split mirror 58. Further, since a reflected tracking light is an unpolarized light and the beam splitter 44 is a polarizing beam splitter, the reflected tracking light is 50% transmitted through the beam splitter 44. The distance measuring light with S-polarization as emitted from the light emitter 42 is totally reflected by the beam splitter 44, and the reflected distance measuring light reflected by the object to be measured is partially (for instance, 7/10) transmitted through the split mirror 58.

The tracking light 57 is turned to a parallel luminous flux by the focusing lens 51 and transmitted through the optical axis deflector 37, and the tracking light 57 is irradiated on the distance measuring light 47. The reflected tracking light reflected by the object to be measured is coaxial with the reflected distance measuring light 48 (that is, the distance measuring optical axis 49), enters the optical axis deflector 37, is transmitted through the optical axis deflector 37, and then reflected by the reflection mirror 46.

The reflection mirror 46 branches a tracking light receiving optical axis 54' from the distance measuring optical axis 49. The beam splitter 44 is arranged on the tracking light receiving optical axis 54', and further a focusing lens 56 and a tracking image pickup element 60 are arranged on the tracking light receiving optical axis 54' The tracking image pickup element 60 is a CCD or a CMOS sensor which is an aggregate of pixels, and each pixel can specify a position on the tracking image pickup element 60. Each pixel has pixel coordinates in a coordinate system with the tracking light receiving optical axis 54' as an origin, for instance. A light receiving signal from each pixel includes an information of the pixel coordinates. Therefore, a position of each pixel on the tracking image pickup element 60 is specified by the pixel coordinates included in the light receiving signal.

The tracking image pickup element 60 receives the reflected tracking light reflected by the object to be measured and produces a light receiving signal, and the light receiving signal is inputted into the tracking calculating module 61. The light receiving signal is produced per each pixel, and each of the light receiving signals produced by each pixel has a positional information (pixel coordinates), respectively. The tracking calculating module 61 calculates a tracking control information required for the tracking based on a light receiving position of the reflected tracking light on the tracking image pickup element 60. For instance, the tracking calculating module 61 calculates a deviation between an image center of the narrow-angle image and the light receiving position of the reflected tracking light.

A part of the functions of the arithmetic control module 26 may be assigned to the tracking calculating module 61. Alternatively, as the tracking calculating module 61, a CPU, a built-in CPU, a microprocessor and the like may be used.

The tracking control information is an information in order to calculate a positional deviation and a direction of the deviation between the tracking light receiving optical axis 54' and the light receiving position of the reflected tracking light on the tracking image pickup element 60 and to make the position of the light receiving position of the reflected tracking light coincide with the tracking light receiving optical axis 54', for instance. The tracking control information includes a control information of the optical axis deflector 37 for controlling a rotation amount and a rotating direction of each disk prism 63 and 64 (to be described later) based on calculation results of the positional deviation of the light receiving position of the reflected tracking light and the direction of the deviation.

The tracking calculating module 61 inputs the tracking control information into the arithmetic control module 26. The arithmetic control module 26 controls the optical axis deflector 37 based on the tracking control information and carries out the tracking. It is to be noted that the tracking calculating module 61 may control the optical axis deflector 37 based on a tracking control signal and carries out the tracking. As the tracking calculating module 61, a general CPU or a CPU specialized for the tracking is used.

The tracking light source 55, the reflection mirror 59, the split mirror 58, the focusing lens 51, the optical axis deflector 37, the beam splitter 44, the focusing lens 56, the tracking image pickup element 60, the tracking calculating module 61 and the like make up the tracking module 23.

Further, into the tracking module 23, a background light including the object to be measured is incident together with the tracking light 57. The tracking image pickup element 60 receives the background light together with the tracking light 57, and a background image including the object to be measured is acquired. Therefore, the tracking module 23, the tracking image pickup element 60 and the like also function as a narrow-angle image pickup module 88 which acquires a background image of a part of a measuring point. An optical axis of the background light coincides with an optical axis of the tracking light 57, and the optical axis of the background light is deflected integrally with the optical axis of the distance measuring light 47 by the optical light deflector 37.

Thus, the tracking module 23 doubles as the narrow-angle image pickup module 88, an image acquired from the tracking image pickup element 60 is acquired as a narrow-angle image, and the narrow-angle image may be acquired as a background image at a sighted position of the distance measuring optical axis 49. It is to be noted that, a center (image center) of the narrow-angle image becomes the distance measuring optical axis 49, that is, the measuring point.

Further, in a case where the tracking module 23 doubles as the narrow-angle image pickup module 88, in a state where the tracking is being performed, the tracking light source 55 is turned on, and the tracking light 57 is irradiated. The tracking image pickup element 60 receives the background light together with the reflected tracking light. Therefore, the tracking module 23 can acquire an image for tracking in a tracking state. Furthermore, in a state where the tracking is not performed, the tracking light source 55 may be turned off, and the background light at the sighted position may be received by the tracking image pickup element 60. In this case, the tracking module 23 serves only as the narrow-angle image pickup module 88 and acquires a narrow-angle background image in a sighting direction (direction of the distance measuring optical axis 49).

The narrow-angle image pickup module 88 receives a limited luminous flux close to the tracking light receiving optical axis 54', which transmits through a central part of the optical axis deflector 37 and is reflected by the reflection mirror 46. A field angle of the narrow-angle image pickup module 88 is narrow, for instance 3°, and the narrow-angle image has a deep depth of a focus. Therefore, in the narrow-angle image pickup module 88, a focusing mechanism can be omitted or simplified, and the narrow-angle image pickup module 88 can acquire an image in a distance measuring range with a single focus.

The optical axis deflector 37 will be described by referring to FIG. 4.

The optical axis deflector 37 is configured by a pair of the disk prisms 63 and 64. Each of the disk prisms 63 and 64 has a disk shape with the same diameter and is disposed on the light receiving optical axis 45 concentrically crossing the light receiving optical axis 45 at a right angle.

Further, the disk prisms 63 and 64 are arranged in parallel at a predetermined interval. The disk prism 63 is formed of an optical glass and has two or more prism columns as arranged in parallel with each other. In the drawing, the disk prism 63 has three prism columns (for instance, three rod-shaped triangular prisms and hereinafter referred to as triangular prisms) 65a, 65b and 65c. Similarly, the disk prism 64 is formed of an optical glass and has three prism columns (for instance, three rod-shaped triangular prisms and hereinafter referred to as triangular prisms) 66a, 66b and 66c as arranged in parallel with each other. It is to be noted that all the triangular prisms 65a, 65b and 65c and the triangular prisms 66a, 66b and 66c have optical characteristics of the same deflection angle.

It is to be noted that a width of each of the triangular prisms 65a and 66a positioned at a center is larger than a beam diameter of the distance measuring light 47, and the distance measuring light 47 is adapted to be transmitted through only the triangular prisms 65a and 66a.

The central part (the triangular prisms 65a and 66a) of the optical axis deflector 37 is a distance measuring light deflector as a first optical axis deflector, through which the distance measuring light 47 is transmitted and is projected. A portion excluding the central part of the optical axis deflector 37 (that is, both end portions of the triangular prisms 65a and 66a and the triangular prisms 65b and 65c, and the triangular prisms 66b and 66c) is a reflected distance measuring light deflector as a second optical axis deflector, through which the reflected distance measuring light 48 is transmitted and is incident.

Each of the disk prisms 63 and 64 is disposed independently and individually rotatably around the light receiving optical axis 45. By independently controlling a rotating direction, a rotation amount and a rotating speed, the disk prisms 63 and 64 deflect the projection optical axis 41 of the projected distance measuring light 47 in an arbitrary direction and deflect the light receiving optical axis 45 of the received reflected distance measuring light 48 in parallel with the projection optical axis 41.

An outer shape of each of the disk prisms 63 and 64 is circular with the light receiving optical axis 45 (reference optical axis "O") as the center. Further, by considering a spread of the reflected distance measuring light 48, a diameter of each of the disk prisms 63 and 64 is set in such a manner that a sufficient light amount can be obtained.

A ring gear 67 is fitted with an outer periphery of the disk prism 63, and a ring gear 68 is fitted with an outer periphery of the disk prism 64.

A driving gear 69 is meshed with the ring gear 67, and the driving gear 69 is fixed to an output shaft of a motor 71. Similarly, a driving gear 72 is meshed with the ring gear 68, and the driving gear 72 is fixed to an output shaft of a motor 73. The motors 71 and 73 are electrically connected to the first motor driver 31.

As the motors 71 and 73, a motor capable of detecting a rotation angle is used, or a motor which rotates correspondingly to a drive input value, for instance, a pulse motor, is used. Alternatively, rotation amounts of the motors 71 and 73 may be detected by using a rotation angle detector which detects the rotation amounts (rotation angles) of the motors such as an encoder, for instance. The rotation amounts of the motors 71 and 73 are detected respectively and the arithmetic control module 26 individually controls the motors 71 and 73 through the first motor driver 31. It is to be noted that, respective encoders are mounted directly on the ring gears 67 and 68 and rotation angles of the ring gears 67 and 68 may be directly detected.

The driving gears 69 and 72 and the motors 71 and 73 are provided at positions not interfering with the other configuration modules such as the distance measuring light projecting module 21 or the like, for instance, on lower sides of the ring gears 67 and 68.

The projecting lens 43, the beam splitter 44, the reflection mirror 46, the distance measuring light deflector (first optical axis deflector) and the like make up a distance measuring projection optical system. Further, the split mirror 58, the focusing lens 51, the reflected distance measuring light deflector (second optical axis deflector) and the like make up a tracking projection optical system.

Further, the distance measuring light deflector (first optical axis deflector), the focusing lens 56 and the like make up a tracking light receiving optical system.

The distance measurement calculating module 25 controls the light emitter 42 and makes the light emitter 42 pulse-emit or burst-emit (intermittently emit) a laser beam as the distance measuring light 47. The projection optical axis 41 is deflected by the triangular prisms 65a and 66a (distance measuring light deflector) in such a manner that the distance measuring light 47 is directed toward the object to be measured. The distance measurement is performed in a state where the distance measuring optical axis 49 sights the object to be measured.

The reflected distance measuring light 48 reflected from the object to be measured is incident through the triangular prisms 65b and 65c, the triangular prisms 66b and 66c (reflected distance measuring light deflector) and the focusing lens 51, and is received by the photodetector 52. The photodetector 52 sends out a light receiving signal to the distance measurement calculating module 25. The distance measurement calculating module 25 performs the distance measurement of the measuring point (point irradiated with the distance measuring light) for each pulsed light based on the light receiving signal from the photodetector 52, and distance measurement data is stored in the storage module 27.

The projecting direction detecting module 29 counts drive pulses inputted into the motors 71 and 73 and detects the rotation angles of the motors 71 and 73. Alternatively, the projecting direction detecting module 29 detects the rotation angles of the motors 71 and 73 based on a signal from the encoders. Further, the projecting direction detecting module 29 calculates rotation positions of the disk prisms 63 and 64 based on the rotation angles of the motors 71 and 73. Further, the projecting direction detecting module 29 calculates a deflection angle and a projecting direction (deflecting direction) of the distance measuring light 47 with respect to the reference optical axis "O" for each pulsed light based on refractive indexes and the rotation positions of the disk prisms 63 and 64. A calculation result (angle measurement result) is associated with a distance measurement result and is inputted into the arithmetic control module 26. It is to be noted that in a case where the distance measuring light 47 is burst-emitted, the distance measurement is performed for each intermittent distance measuring light.

By controlling the rotation amount and the rotating direction of each of the motors 71 and 73, the arithmetic control module 26 is capable of controlling a deflection amount and a deflecting direction of the distance measuring optical axis 49 by the optical axis deflector 37. Further, by controlling a rotating direction and a rotating speed of each of the motors 71 and 73 and a rotation ratio between the motors 71 and 73, the arithmetic control module 26 is capable of dynamically controlling a deflecting action by the optical axis deflector 37 and of scanning the distance measuring optical axis 49 in an arbitrary direction and in an arbitrary pattern.

Figure 4:
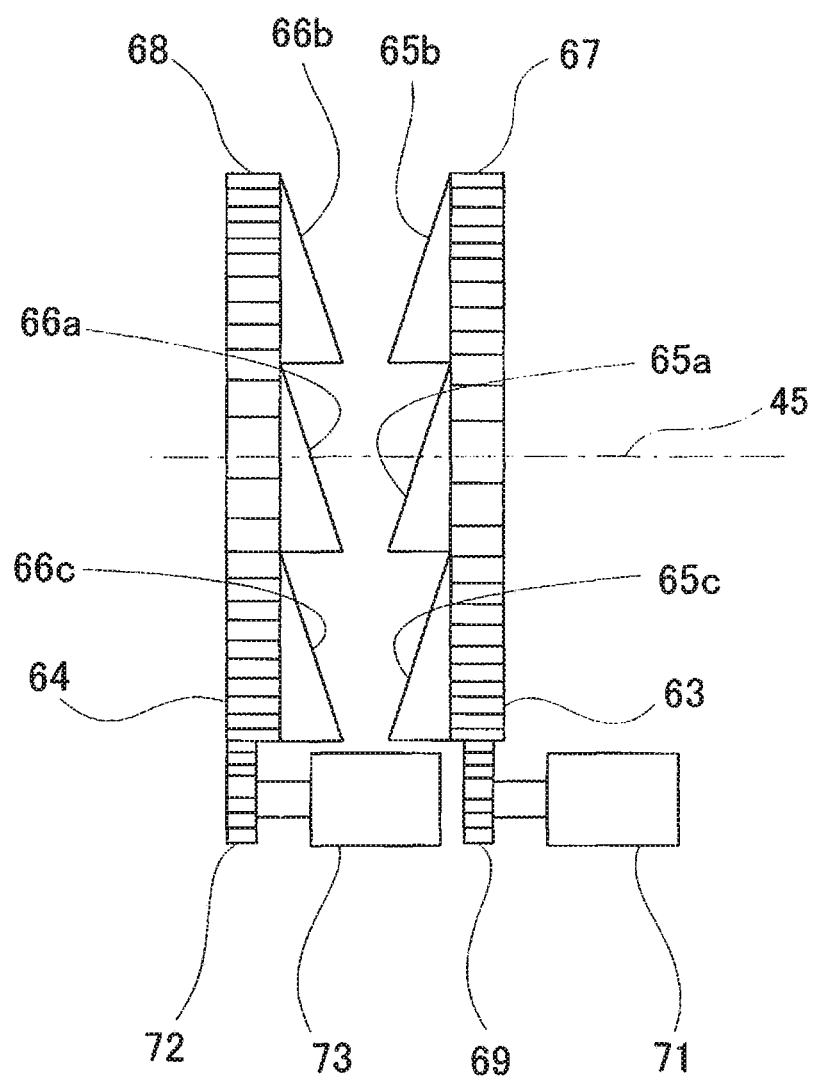
FIG. 4 is an enlarged view of an essential part of an optical axis deflector in the surveying instrument.

FIG. 4 shows a state where the triangular prisms 65a and 66a and the triangular prisms 65b, 65c, 66b and 66c are positioned in the same direction, and a maximum deflection angle (±20°, for instance) is obtained in this state. Further, a minimum deflection angle is obtained at a position where either one of the disk prisms 63 and 64 is rotated by 180°, mutual optical actions of the disk prisms 63 and 64 are offset, and the deflection angle becomes 0°. Therefore, the optical axis (the distance measuring optical axis 49) of the pulsed laser beam projected and received through the disk prisms 63 and 64 coincides with the reference optical axis "O".

The distance measuring light 47 is emitted from the light emitter 42. The distance measuring light 47 is made to a parallel luminous flux by the projecting lens 43, is transmitted through the distance measuring light deflector (the triangular prisms 65a and 66a) and is projected toward the object to be measured. Here, when the distance measuring light 47 transmits through the distance measuring light deflector, the distance measuring light 47 is deflected by the triangular prisms 65a and 66a in a required direction and is projected.

The reflected distance measuring light 48 reflected by the object to be measured transmits through the reflected distance measuring light deflector and is incident, and is focused by the focusing lens 51 on the photodetector 52.

When the reflected distance measuring light 48 transmits through the reflected distance measuring light deflector, an optical axis of the reflected distance measuring light 48 is deflected by the triangular prisms 65b and 65c and the triangular prisms 66b and 66c in such a manner that the optical axis of the reflected distance measuring light 48 coincide with the light receiving optical axis 45.

It is possible to arbitrarily change the deflecting direction and the deflection angle of the projected distance measuring light 47 by combining the rotation position of the disk prism 63 and the rotation position of the disk prism 64.

Further, in a state where a positional relationship between the disk prism 63 and the disk prism 64 is fixed (that is, in a state where a deflection angle obtained by the disk prism 63 and the disk prism 64 is fixed), the disk prism 63 and the disk prism 64 are rotated integrally by the motors 71 and 73. In this case, a locus drawn by the distance measuring light 47, which transmits through the distance measuring light deflector, becomes a circle with the reference optical axis "O" as the center. Further, a required two-dimensional closed loop scan pattern can be formed by a combination between the rotation of the disk prism 63 and the rotation of the disk prism 64.

The arithmetic control module 26 calculates a horizontal angle and a vertical angle of the measuring point with respect to the reference optical axis "O" based on the deflection angle and the projecting direction of the distance measuring light 47, that is, based on the detection result of the projecting direction detecting module 29. Further, the arithmetic control module 26 is capable of acquiring three-dimensional data of the object to be measured by associating the horizontal angle and the vertical angle on the measuring point with the distance measurement data.

Furthermore, in a case where a directional angle exceeding the maximum deflection angle of the optical axis deflector 37 is required, the arithmetic control module 26 controls the horizontal motor 13 and the vertical motor 17 via the second motor driver 32, rotates the surveying instrument 3 and projects the distance measuring light 47 on the measuring point.

In this case, an actual horizontal angle and vertical angle (a horizontal angle and a vertical angle to the horizontal (or the vertical)) of the measuring point are obtained based on the horizontal angle and the vertical angle of the measuring point with respect to the reference optical axis "O" and based on the horizontal angle and the vertical angle of the reference optical axis "O" with respect to the horizontal (or the vertical) detected by the horizontal angle detector 9 and the vertical angle detector 18. Further, the arithmetic control module 26 is capable of acquiring the three-dimensional data of the object to be measured by associating the actual horizontal angle and vertical angle with the distance measurement data.

Thus, the surveying instrument 3 functions as a total station.

The wide-angle image pickup module 24 has an image pickup optical axis 75 in parallel with the reference optical axis "O" of the surveying instrument 3 and an image pickup lens 76 arranged on the image pickup optical axis 75. The wide-angle image pickup module 24 is a camera which has a field angle substantially equal to the maximum deflection angle (±20°, for instance) of the disk prisms 63 and 64 or has a field angle larger than the maximum deflection angle of the disk prisms 63 and 64, for instance, 50 to 60°. The wide-angle image pickup module 24 acquires image data including a maximum deflection range by the optical axis deflector 37.

The relationship between the image pickup optical axis 75, the projection optical axis 41 and the reference optical axis "O" is known. That is, the image pickup optical axis 75 is in parallel with the projection optical axis 41 and the reference optical axis "O", and further, a distance among each of the optical axes is a known value. Further, the wide-angle image pickup module 24 is capable of acquiring a video image or a continuous image.

As the image pickup control module 34, a general-purpose CPU or a CPU specialized for this instrument is used, or a part of the functions of the arithmetic control module 26 may be assigned to the image pickup control module 34. The image pickup control module 34 controls an image pickup of the wide-angle image pickup module 24. In a case where the wide-angle image pickup module 24 picks up the video image or the continuous images, the image pickup control module 34 synchronizes a timing of when the wide-angle image pickup module 24 picks up a frame image, which constitutes the video image or the continuous images, with a timing (timing of the distance measurement for each pulsed laser beam) of when the surveying instrument 3 performs the distance measurement. Further, in a case where the narrow-angle image pickup module 88 (see FIG. 3) acquires an image, the image pickup control module 34 synchronizes a timing of when the narrow-angle image pickup module 88 acquires the image with a timing of the distance measurement. It is to be noted that the arithmetic control module 26 may synchronize an image pickup timing of the wide-angle image pickup module 24, a distance measuring timing of the surveying instrument 3 and an image pickup timing of the narrow-angle image pickup module 88 with each other.

The narrow-angle image pickup module 88 functions as a finder of a distance measuring part since the narrow-angle image pickup module 88 acquires an image of an irradiated point of the distance measuring light 47. Further, since an image which the narrow-angle image pickup module 88 acquires is an image in a narrow field angle (for instance, 3°) close to the distance measuring optical axis 49, a distortion is small.

The arithmetic control module 26 also carries out an association of the image in the narrow field angle (narrow-angle image) with measurement data (distance measurement data, angle measurement data).

An image pickup element 77 of the wide-angle image pickup module 24 is a CCD or a CMOS sensor which is an aggregate of pixels, and a position of each pixel can be specified on the image pickup element 77. For instance, each pixel has pixel coordinates in a coordinate system with the image pickup optical axis 75 as an origin. Further, a light receiving signal from each pixel includes the information of the pixel coordinates. Therefore, a position of each pixel on the image pickup element 77 is specified by the pixel coordinates included in the light receiving signal. Further, since a relationship between the image pickup optical axis 75 of the wide-angle image pickup module 24 and the tracking optical axis 54 is known, it is easy to associate the image (wide-angle image) acquired by the wide-angle image pickup module 24 with the narrow-angle image.

Further, the image pickup optical axis 75 of the wide-angle image pickup module 24 is in parallel with the reference optical axis "O", and further, a relationship between the image pickup optical axis 75 and the reference optical axis "O" is known and thus, when the position on the image pickup element 77 is specified, the deflection angle with respect to the reference optical axis "O" can be detected regarding the specified position.

The image processing module 35 executes image processings such as an edge extraction processing, a extraction of a feature point, a detection of the object to be measured, an image tracking processing, an image matching and the like for the image data as acquired by the wide-angle image pickup module 24, and further, creates a gray-scaled image from the image data.

The display module 36 displays an image acquired by the wide-angle image pickup module 24 or displays the narrow-angle image acquired by the narrow-angle image pickup module 88. Further, the display module 36 divides a display screen and displays the wide-angle image acquired by the wide-angle image pickup module 24 on a part and displays the narrow-angle image acquired by the narrow-angle image pickup module 88 on the other part in an enlarged manner.

Figure 5:
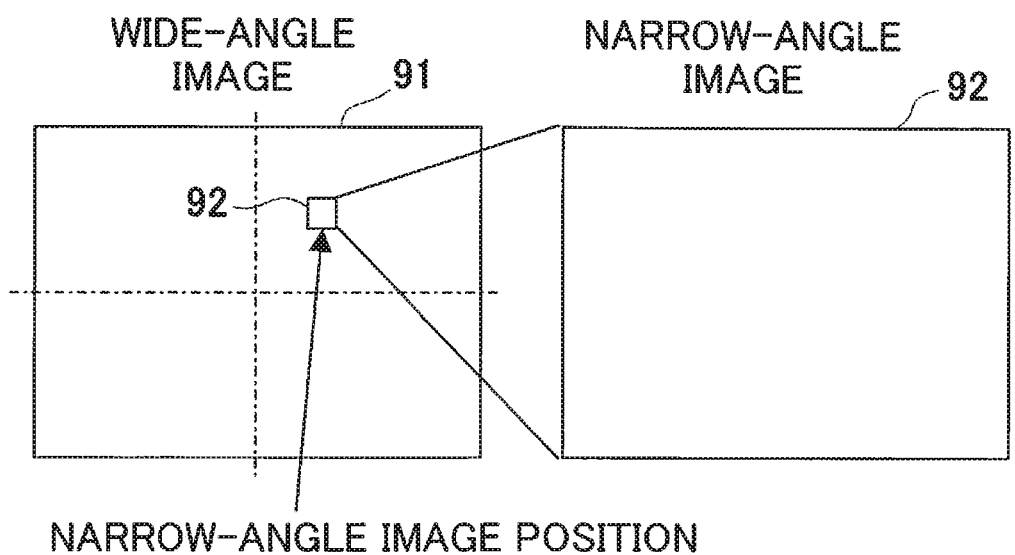
FIG. 5 is a drawing to show a relationship between a wide-angle image and a narrow-angle image.

Alternatively, as shown in FIG. 5, the display module 36 superimposes a narrow-angle image 92 on a wide-angle image 91 and displays the superimposed image. As described above, the relationship between the reference optical axis "O" and the image pickup optical axis 75 is known. Further, a position of the measuring point in the wide-angle image 91 is obtained as a field angle with respect to the reference optical axis "O", and a directional angle (directional angle of the distance measuring light 47) of a center of the narrow-angle image 92 with respect to the reference optical axis "O" is detected by the projecting direction detecting module 29. Therefore, it is easy to superimpose the narrow-angle image 92 on the wide-angle image 91 based on the field angle in the wide-angle image 91 and the directional angle of the narrow-angle image 92. By superimposing the narrow-angle image 92 on the wide-angle image 91, it is possible to easily recognize which position in the object to be measured is measured.

As a method for superposing the narrow-angle image 92 on the wide-angle image 91 and displaying the superimposed image, various methods are adopted, such that the wide-angle image 91 and the narrow-angle image 92 are displayed with the same magnification, a position where the narrow-angle image 92 is displayed by dots or a symbol such as an arrow and the like, are adopted.

Further, when the wide-angle image 91 and the narrow-angle image 92 are superimposed with the same magnification, a distortion of the wide-angle image 91 can be corrected by directional angle data which the narrow-angle image 92 has, and a wide-angle image 91 in which the distortion is corrected can be acquired.

Further, the display module 36 displays measurement states, the measurement data and the like. It is to be noted that the display module 36 is made as a touch panel and functions also as an operation module. Further, the display module 36 with a touch panel function may be detachable to the surveying instrument 3, and in a handheld condition, a remote control by the display module 36 may be enabled.

In the storage module 27, various types of programs are stored. These programs include: a program for controlling a light emission timing of the light emitter 42, a program for controlling a rotation of the optical axis deflector 37, a program for performing the distance measurement based on the light reception timing of the reflected distance measuring light 48, respectively, a program for performing the angle measurement based on the refractive indexes and the rotation positions of the disk prisms 63 and 64, respectively, a program for calculating the three-dimensional data of a surface to be measured based on the distance measurement result and the angle measurement result, a program for controlling the image pickup by the wide-angle image pickup module 24, a program for detecting an attitude of the surveying instrument 3 based on the detection result of the attitude detector 28, a program for creating an image with the three-dimensional data in which the three-dimensional coordinates are given to each pixel based on the measurement data (the distance measurement data, the angle measurement data) and the image, and other programs.

Each of the programs stored in the storage module 27 is executed or developed by the arithmetic control module 26 and the like, and the various processings are executed.

A description will be given below on an action of the surveying instrument system 1 according to the present embodiment.

The surveying instrument 3 is installed at a known point (point of which the three-dimensional coordinates are already-known) via the tripod 2.

The surveying instrument 3 has the attitude detector 28, and an installation attitude (tilt) of the surveying instrument 3 with respect to the horizontal can be detected by the attitude detector 28. For this reason, a leveling operation of the surveying instrument 3 is not required. An accurate measurement result can be obtained by correcting the measurement result by a detected tilt.

The reference optical axis "0" is directed to the object to be measured (measuring point).

As the method of directing the reference optical axis "0" to the object to be measured (measuring point), the distance measuring optical axis 49 is coincided with the reference optical axis "0", that is, in a state where the distance measuring optical axis 49 is not deflected by the optical axis deflector 37, the reference optical axis "O" is sighted to the object to be measured. An image, as picked up by the narrow-angle image pickup module 88, is displayed on the display module 36 and the worker checks the sighted state according to the image. (In the following description, a case where the tracking module 23 is used also as the narrow-angle image pickup module 88 will be described.)

Alternatively, the wide-angle image pickup module 24 is directed to the object to be measured, a wide-angle image including the object to be measured is acquired, and the wide-angle image is displayed on the display module 36. Further, the narrow-angle image acquired by the narrow-angle image pickup module 88 is superposed on the wide-angle image and displayed on the display module 36, the deflection by the optical axis deflector 37 is adjusted, and the center of the narrow-angle image (sighted position of the distance measuring light 47) is coincided with the object to be measured in the wide-angle image. In this case, the deflection angle of the distance measuring light 47 (that is, the rotation angle of each of the disk prisms 63 and 64) of when the distance measuring light 47 is sighted, is also obtained.

As a method to operate the optical axis deflector 37 and to finally sight the distance measuring optical axis 49 to the measuring point, the worker may manually perform the sighting while checking the display on the display module 36. Alternatively, the image processing module 35 detects the object to be measured, and the arithmetic control module 26 may perform the sighting automatically based on the detection result.

At a time when the distance measuring optical axis 49 is sighted on the measuring point, a distance measurement is performed, and a directional angle of the distance measuring optical axis 49 at the distance measurement is calculated based on the detection results of the horizontal angle detector 9 and the vertical angle detector 18, and the rotation angles of the disk prisms 63 and 64, and three-dimensional coordinates of the measuring point are determined by the distance measurement value and the directional angle.

It is to be noted that when the surveying instrument 3 is tilted with respect to the horizontal, the tilt angle is detected by the attitude detector 28, and the determined three-dimensional coordinates are corrected based on the tilt angle.

When there is a plurality of the measuring points, the distance measuring optical axis 49 is sequentially sighted on the measuring point, and the measurements are performed.

The measurement result of the measuring point is associated with the measuring point and stored in the storage module 27.

Next, by referring to FIG. 3 and FIG. 4, a description will be given on a case where the measurement is carried out while tracking the object to be measured such as setting and the like. Here, the object to be measured is an optical component with retro-reflectivity such as a prism and the like, and the measuring point is indicated by the object to be measured.

In a state where the object to be measured is caught by the wide-angle image pickup module 24, the distance measuring optical axis 49 is sighted on the object to be measured. It is to be noted that, at this time, the reference optical axis "O" and the distance measuring optical axis 49 may coincide or may not coincide each other.

The tracking light source 55 is turned on, and the tracking light is emitted. The tracking light 57 is the unpolarized beam. Further, the tracking light 57 has a predetermined spread. It is to be noted that the distance measuring light 47 is a laser beam with S-polarization.

The tracking light 57 is deflected by the reflection mirror 59, and the tracking light 57 is 30% reflected by the split mirror 58 which is a non-polarization split mirror with a 70% transmissivity and a 30% reflectivity. The tracking light 57 reflected by the split mirror 58 is turned to a parallel luminous flux with substantially the same diameter as the diameters of the disk prisms 63 and 64 by the focusing lens 51, is transmitted through the optical axis deflector 37, and is irradiated to the object to be measured, and the tracking is started.

The reflected tracking light from the object to be measured is transmitted through the optical axis deflector 37, and a luminous flux of a central part of the reflected tracking light is reflected by the reflection mirror 46.

The reflected tracking light reflected by the reflection mirror 46 is 50% transmitted through the beam splitter 44 and focused on the tracking image pickup element 60 by the focusing lens 56.

The light receiving signal from the tracking image pickup element 60 is inputted into the tracking calculating module 61. The tracking calculating module 61 calculates the light receiving position on the tracking image pickup element 60 based on the light receiving signal and judges a tracking state.

The tracking calculating module 61 judges that the distance measuring optical axis 49 accurately tracks the object to be measured when the position of the reflected tracking light on the tracking image pickup element 60 coincides with the reference position, for instance, the position of the tracking light receiving optical axis 54' Further, the tracking calculating module 61 controls the optical axis deflector 37 in such a manner that the light receiving position of the reflected tracking light becomes the reference position. That is, the tracking calculating module 61 controls the rotating directions and the rotation amounts of the disk prisms 63 and 64 of the optical axis deflector 37, controls the deflection angle and the deflecting direction of the distance measuring optical axis 49 and performs the tracking of the object to be measured.

It is to be noted that the tracking calculating module 61 may calculate the light receiving position of the reflected tracking light and output the calculation result to the arithmetic control module 26, and the arithmetic control module 26 may control the optical axis deflector 37 and control the tracking.

In the tracking operation, the deflection of the distance measuring optical axis 49 is caused by the rotation of each of the disk prism 63 and the disk prism 64. The disk prisms 63 and 64 are small-sized and light-weighted and hence can be rotated by the motors 71 and 73 at a high speed and with high responsiveness.

Therefore, an improvement of the responsiveness of the tracking operation and a speed-up of a tracking speed can be realized, and a trackability is improved regarding the object to be measured which moves at a high speed.

The projecting direction detecting module 29 calculates the deflection angle of the distance measuring optical axis 49 with respect to the reference optical axis "O" based on the detection results of the rotation amounts and the rotating directions of the disk prisms 63 and 64, and the projecting direction detecting module 29 outputs the calculation result to the arithmetic control module 26.

The arithmetic control module 26 drives the horizontal motor 13 and the vertical motor 17 and rotates the surveying instrument 3 in the horizontal direction and/or in the vertical direction in such a manner that the deflection angle with respect to the reference optical axis "O" becomes 0 based on the calculation result of the projecting direction detecting module 29.

Therefore, a tracking can be performed even if the object to be measured moves beyond the maximum deflection angle of the optical axis deflector 37, that is, in a range on the entire periphery of 360°, and further, in upper and lower ranges beyond the maximum deflection angle. It is to be noted that a rotation responsiveness, a horizontal rotation speed and a vertical rotation speed of the surveying instrument 3 cannot be considered to be fast, but since the optical axis deflector 37 follows-up at a high speed, there is no problem with the trackability in a follow-up extending to the range beyond the maximum deflection angle of the optical axis deflector 37.

In a case where the movement of the object to be measured is slow, that is, in a case where the surveying instrument 3 can follow the movement of the object to be measured, the tracking is performed in a state where the reference optical axis "O" and the distance measuring optical axis 49 coincide with each other.

Further, in a case where the distance measurement is performed in a state where the reference optical axis "O" and the distance measuring optical axis 49 are deviated from each other, the directional angle of the object to be measured with respect to the installation position of the surveying instrument 3 is calculated based on the deflection angle and the direction of the distance measuring optical axis 49 obtained by a relative angle and a relative rotating direction between the disk prisms 63 and 64 and based on the horizontal angle and the vertical angle detected by the horizontal angle detector 9 and the vertical angle detector 18.

The three-dimensional coordinates of the measuring point with reference to the installation point of the surveying instrument 3 is determined based on the directional angle and the distance measurement result of the object to be measured with respect to the installation position.

In a case where there are two or more measuring points, the three-dimensional coordinates of each of the measuring points are stored in the storage module 27. Further, the arithmetic control module 26 can superpose each of the measuring points on the wide-angle image as acquired by the wide-angle image pickup module 24 and display the measuring points based on the three-dimensional coordinates of each of the measuring points. By displaying each of the measuring points on the wide-angle image, a progress state of the measurement, a measurement position, measuring points which have been measured and measuring points which have not been measured are clarified, and a duplicated measurement and a missing of the measurement can be prevented.

As described above, in a case where the narrow-angle image and/or the measuring point are superposed on the wide-angle image, the relationships between the optical axes of the light receiving module 22, the tracking module 23 and the wide-angle image pickup module 24 are already-known, and further, since the relationships are fixed, it is needless to say that the narrow-angle image and/or the measuring point can be superposed on the wide-angle image only with respective angle informations (deflection angle information of the distance measuring optical axis 49) of the disk prisms 63 and 64.

In the tracking operation, in a case where the tracking by the tracking module 23 is discontinued by a rapid movement of the object to be measured, the tracking state can be recovered based on the wide-angle image as acquired by the wide-angle image pickup module 24.

The image processing module 35 detects the object to be measured from the wide-angle image by the image processing and calculates the position of the object to be measured in the wide-angle image. The calculation result is inputted into the arithmetic control module 26.

Since the relationship between the image pickup optical axis 75 and the distance measuring optical axis 49 is already-known, the arithmetic control module 26 calculates the position of the object to be measured with respect to the reference optical axis "O" (the deflection angle of the distance measuring optical axis 49 with respect to the reference optical axis "O") based on the position of the object to be measured in the wide-angle image. The arithmetic control module 26 controls the optical axis deflector 37 in such a manner that the distance measuring optical axis 49 becomes the deflection angle. Thus, even if the tracking is discontinued, the state can be recovered to the taking immediately.

It is to be noted that the detection of the object to be measured by the image processing module 35 may be performed in a case where the tracking is discontinued or may be performed continuously at all times.

In the above embodiment, a description has been given on a case where the distance measuring light 47 and the tracking light 57 have the same wave length, but the wave length of the distance measuring light 47 may be different from the wavelength of the tracking light 57. In this case, as each of the split mirror 58 and the beam splitter 44, a dichroic mirror with a wave length selecting function is used. Further, it is preferable to use the dichroic mirror as at least the beam splitter 44.

When the wavelength of the distance measuring light 47 and the wavelength of the tracking light 57 are different from each other, a refraction state at the time of when the distance measuring light 47 and the tracking light 57 transmit through the disk prisms 63 and 64 is different, a deviation occurs in a directional angle, but the deviation in the directional angle can be calculated based on the wave lengths and the refractive indexes of the disk prisms 63 and 64, and hence the deviation in the directional angle may be corrected based on the calculation result.

In the above embodiment, a description has been given on a case where the surveying instrument 3 is fixed on the tripod 2, but the worker can hold and carry the surveying instrument 3 alone and can perform the measurement of the measuring point in a handheld condition.

In a state where the worker carries the surveying instrument 3, the attitude of the surveying instrument 3 is unstable, and the distance measuring optical axis 49 directed toward the measuring point is also shaken, but the distance measuring optical axis 49 can be deflected by the optical axis deflector 37 at a high speed and the measuring point can be tracked, and hence the distance measuring optical axis 49 can be accurately directed toward the measuring point even in a hand-shake state, and a highly-accurate measurement can be carried out. It is to be noted that it is needless to say that the attitude (tilt) of the surveying instrument 3 is detected by the attitude detector 28 in real time, and the optical axis deflector 37 is controlled by the arithmetic control module 26 based on the detection result of the attitude detector 28.

Further, even in a state where the worker carries the surveying instrument 3, the object to be measured can be tracked.

In the above description, the surveying instrument 3 is described as the total station, but when the disk prisms 63 and 64 of the optical axis deflector 37 are continuously rotated, respectively, and further the rotating speeds and rotating directions are individually controlled, the distance measuring optical axis 49 can be scanned in the arbitrary pattern. Further, if the distance measurement is performed per each pulsed light while scanning, point cloud data can be acquired along a scan line, and the surveying instrument 3 can be also used as a laser scanner.

As described above, by individually controlling the rotations of the optical prism 63 and the optical prism 64, various two-dimensional scan patterns can be formed.

Figure 6:
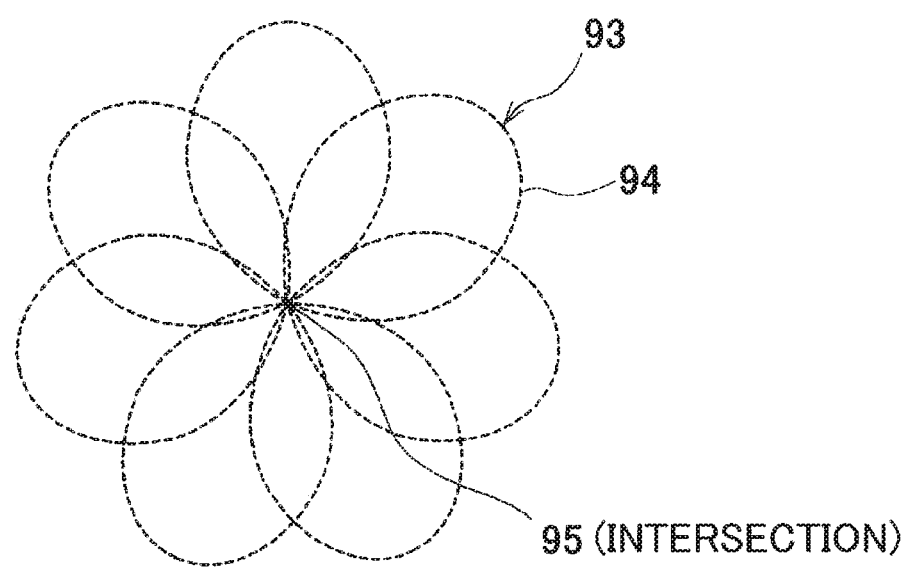
FIG. 6 is a drawing to show an example of a scan pattern.

For instance, when the one optical prism 63 in the optical prism 63 and the optical prism 64 is rotated by 25 rotations and the other optical prism 64 is rotated by 5 rotations in the opposite direction, a flower petal-shaped two-dimensional closed loop scan pattern (flower petal pattern 93 (hypotrochoid curve)) as shown in FIG. 6 is obtained. It is to be noted that dots on the pattern shows measuring points 94. Further, in FIG. 6, a reference numeral 95 denotes a center of the flower petal pattern 93, and the center of the flower petal pattern 93 coincides with the reference optical axis "O". Further, the reference numeral 95 denotes an intersection of the scan loci.

When the point cloud data is acquired along the scan line, the surveying instrument 3 according to the present embodiment can be used as the laser scanner. Further, when a point cloud density is desired to be increased in case of carrying out the flower petal pattern 93, by rotating a whole of the flower petal pattern 93 sequentially by a predetermined angle every time the flower pattern 92 is carried out by one pattern, the point cloud density can be increased.

Further, since an image pickup position (image center) of the narrow-angle image pickup module 88 is the same as the measuring points 94, by synchronizing an image pickup of the narrow-angle image pickup module 88 with the measurements, a still image at an arbitrary point in the scan can be acquired. Further, when the image is acquired per each measuring point, an image associated with the measuring points can be acquired, and point cloud data with an image can be immediately acquired.

The invention claimed is:

1. A surveying instrument comprising a distance measuring light projecting module configured to project a distance measuring light, a light receiving module configured to receive a reflected distance measuring light, an optical axis deflector which is provided at a common part of a distance measuring optical axis and a light receiving optical axis and integrally deflects said distance measuring optical axis and said light receiving optical axis, a wide-angle image pickup module having approximately the same field angle as a maximum deflection range of said optical axis deflector, a projecting direction detecting module configured to detect an optical axis deflection angle and a deflecting direction by said optical axis deflector, a narrow-angle image pickup module having an optical axis a part of which is common to said distance measuring optical axis and having a field angle narrower than the field angle of said wide-angle image pickup module, a distance measurement calculating module, an arithmetic control module and a tracking module, wherein said arithmetic control module is configured to control an optical axis deflection of said optical axis deflector and a distance measuring operation of said distance measurement calculating module, wherein said distance measurement calculating module is configured to perform a distance measurement of a measuring point based on a light emission timing of said distance measuring light and a light reception timing of said reflected distance measuring light, wherein said narrow-angle image pickup module is configured to acquire a narrow-angle image with said distance measuring optical axis as an image center, and wherein said tracking module has a tracking optical axis a part of which is common to said light receiving optical axis, a tracking light receiving optical axis branched from a projection optical axis of said distance measuring light projecting module, a tracking light source provided on said tracking optical axis, and a tracking image pickup element provided on said tracking light receiving optical axis, wherein said tracking module is configured in such a manner that a tracking light, as emitted from said tracking light source, is projected via said light receiving optical axis, said tracking light reflected by an object to be measured is received by said tracking image pickup element via said projection optical axis and said tracking light receiving optical axis, and wherein said arithmetic control module is configured to control a deflection of said optical axis deflector based on a deviation on said tracking image pickup element between a light receiving position of said tracking light and said tracking light receiving optical axis.

2. The surveying instrument according to claim 1, wherein said narrow-angle image pickup module has a tracking light receiving optical axis branched from a projection optical axis of said distance measuring light projecting module and a tracking image pickup element provided on said tracking light receiving optical axis, and said narrow-angle image pickup module is configured to acquire said narrow-angle image by said tracking image pickup element via said projection optical axis.

3. A surveying instrument system comprising a surveying instrument according to claim 2, a supporting unit for installing said surveying instrument and an installation base unit which is a supporting part of said surveying instrument, wherein said installation base unit includes a rotary driving module configured to rotate and drive said surveying instrument in a horizontal direction and a vertical direction and angle detectors adapted to detect a horizontal rotation angle and a vertical rotation angle, and wherein said arithmetic control module is configured to control said rotary driving module of said optical axis deflector and to carry out a tracking of an object to be measured, and said arithmetic control module is configured to control said rotary driving module of said installation base unit and said rotary driving module of said optical axis deflector in such a manner that a deflection angle of said distance measuring optical axis detected by said projecting direction detecting module becomes 0.

4. The surveying instrument according to claim 1, wherein said tracking light receiving optical axis is branched by a polarizing beam splitter, said distance measuring light and said tracking light have different polarizations, and said distance measuring light is separated from said tracking light by said polarizing beam splitter.

5. A surveying instrument system comprising a surveying instrument according to claim 4, a supporting unit for installing said surveying instrument and an installation base unit which is a supporting part of said surveying instrument, wherein said installation base unit includes a rotary driving module configured to rotate and drive said surveying instrument in a horizontal direction and a vertical direction and angle detectors adapted to detect a horizontal rotation angle and a vertical rotation angle, and wherein said arithmetic control module is configured to control said rotary driving module of said optical axis deflector and to carry out a tracking of an object to be measured, and said arithmetic control module is configured to control said rotary driving module of said installation base unit and said rotary driving module of said optical axis deflector in such a manner that a deflection angle of said distance measuring optical axis detected by said projecting direction detecting module becomes 0.

6. The surveying instrument according to claim 1, wherein said optical axis deflector comprises two disk prisms which are coaxially provided, each of said disk prisms is constituted of a plurality of triangular prisms with the same optical characteristics and is independently rotatable around said distance measuring optical axis and said light receiving optical axis, and wherein said arithmetic control module is configured to control rotations of said two disk prisms, to make said distance measuring light scan in a two-dimensional closed loop and to acquire point cloud data.

7. The surveying instrument according to claim 6, wherein said arithmetic control module is configured to synchronize a distance measurement timing with an image acquisition by said narrow-angle image pickup module and to acquire a still image at an arbitrary position while scanning.

8. A surveying instrument system comprising a surveying instrument according to claim 7, a supporting unit for installing said surveying instrument and an installation base unit which is a supporting part of said surveying instrument, wherein said installation base unit includes a rotary driving module configured to rotate and drive said surveying instrument in a horizontal direction and a vertical direction and angle detectors adapted to detect a horizontal rotation angle and a vertical rotation angle, and wherein said arithmetic control module is configured to control said rotary driving module of said optical axis deflector and to carry out a tracking of an object to be measured, and said arithmetic control module is configured to control said rotary driving module of said installation base unit and said rotary driving module of said optical axis deflector in such a manner that a deflection angle of said distance measuring optical axis detected by said projecting direction detecting module becomes 0.

9. A surveying instrument system comprising a surveying instrument according to claim 6, a supporting unit for installing said surveying instrument and an installation base unit which is a supporting part of said surveying instrument, wherein said installation base unit includes a rotary driving module configured to rotate and drive said surveying instrument in a horizontal direction and a vertical direction and angle detectors adapted to detect a horizontal rotation angle and a vertical rotation angle, and wherein said arithmetic control module is configured to control said rotary driving module of said optical axis deflector and to carry out a tracking of an object to be measured, and said arithmetic control module is configured to control said rotary driving module of said installation base unit and said rotary driving module of said optical axis deflector in such a manner that a deflection angle of said distance measuring optical axis detected by said projecting direction detecting module becomes 0.

10. The surveying instrument according to claim 1, wherein said arithmetic control module is configured to associate a narrow-angle image with a wide-angle image based on a deflection angle and a deflecting direction detected by said projecting direction detecting module at the time of when acquiring said narrow-angle image by said narrow-angle image pickup module and a position of each pixel of said wide-angle image corresponding to said deflection angle and said deflecting direction.

11. A surveying instrument system comprising a surveying instrument according to claim 10, a supporting unit for installing said surveying instrument and an installation base unit which is a supporting part of said surveying instrument, wherein said installation base unit includes a rotary driving module configured to rotate and drive said surveying instrument in a horizontal direction and a vertical direction and angle detectors adapted to detect a horizontal rotation angle and a vertical rotation angle, and wherein said arithmetic control module is configured to control said rotary driving module of said optical axis deflector and to carry out a tracking of an object to be measured, and said arithmetic control module is configured to control said rotary driving module of said installation base unit and said rotary driving module of said optical axis deflector in such a manner that a deflection angle of said distance measuring optical axis detected by said projecting direction detecting module becomes 0.

12. A surveying instrument system comprising a surveying instrument according claim 1, a supporting unit for installing said surveying instrument and an installation base unit which is a supporting part of said surveying instrument, wherein said installation base unit includes a rotary driving module configured to rotate and drive said surveying instrument in a horizontal direction and a vertical direction and angle detectors adapted to detect a horizontal rotation angle and a vertical rotation angle, and wherein said arithmetic control module is configured to control said rotary driving module of said optical axis deflector and to carry out a tracking of an object to be measured, and said arithmetic control module is configured to control said rotary driving module of said installation base unit and said rotary driving module of said optical axis deflector in such a manner that a deflection angle of said distance measuring optical axis detected by said projecting direction detecting module becomes 0.

* * * * *